(12) United States Patent
Sun et al.

(10) Patent No.: US 12,169,500 B1
(45) Date of Patent: Dec. 17, 2024

(54) SYSTEMS, METHODS, AND APPARATUSES FOR GENERATING, EXTRACTING, CLASSIFYING, AND FORMATTING OBJECT METADATA USING NATURAL LANGUAGE PROCESSING IN AN ELECTRONIC NETWORK

(71) Applicant: BANK OF AMERICA CORPORATION, Charlotte, NC (US)

(72) Inventors: Yile Sun, Sudbury, MA (US); Mohammad Sarker, Jamaica, NY (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

(21) Appl. No.: 18/228,868

(22) Filed: Aug. 1, 2023

(51) Int. Cl.
*G06F 16/25* (2019.01)
*G06F 40/205* (2020.01)

(52) U.S. Cl.
CPC .......... *G06F 16/254* (2019.01); *G06F 40/205* (2020.01)

(58) Field of Classification Search
CPC .............................. G06F 16/254; G06F 40/205
See application file for complete search history.

(56) References Cited

U.S. PATENT DOCUMENTS

| | | |
|---|---|---|
| 6,833,865 B1 | 12/2004 | Fuller |
| 7,818,215 B2 | 10/2010 | King |
| 7,908,141 B2 | 3/2011 | Belknap |
| 8,296,435 B2 | 10/2012 | Conleth, Jr. |
| 8,639,719 B2 | 1/2014 | Fisher |
| 8,799,099 B2 | 8/2014 | King |
| 8,838,556 B1 | 9/2014 | Reiner |
| 8,934,717 B2 | 1/2015 | Newell |
| 9,047,283 B1 * | 6/2015 | Zhang ................. G06F 16/3346 |
| 9,715,506 B2 | 7/2017 | Rosen |
| 9,842,093 B2 | 12/2017 | Powell |
| 9,984,408 B1 | 5/2018 | Wong |
| 10,068,016 B2 * | 9/2018 | Wolfram ............... G06F 16/951 |
| 10,223,368 B2 | 3/2019 | Bhosale |
| 10,255,253 B2 | 4/2019 | Akselrod |
| 10,515,143 B2 | 12/2019 | Grossman |
| 10,685,061 B2 | 6/2020 | Levy |
| 10,915,492 B2 * | 2/2021 | Rexer ............... G06F 15/17306 |
| 11,437,139 B2 | 9/2022 | Bradley |

(Continued)

*Primary Examiner* — Huawen A Peng
(74) *Attorney, Agent, or Firm* — Moore & Van Allen PLLC; Lauren M. Stokes

(57) ABSTRACT

Systems, computer program products, and methods are described herein for generating, extracting, classifying, and formatting object metadata using natural language processing in an electronic network. The present disclosure is configured to identify at least one input source, comprising at least one input data; parse the at least one input data; output, by an extraction layer, at least one product metadata and a term importance score associated with the input data to a metadata storage, the extraction layer comprising an NLP attribute extraction model; assemble, by an assignment layer, a corpus of text data and key phrases based on the product metadata from the extraction layer, the assignment layer comprising an NLP classification model; classify and verify, by the assignment layer, the product metadata; and output, by a generative layer, at least one generative metadata to the metadata storage, the generative layer comprising a pretrained generative NLP model.

17 Claims, 10 Drawing Sheets

(56) References Cited

U.S. PATENT DOCUMENTS

| | | |
|---|---|---|
| 2007/0050366 A1 | 3/2007 | Bugir |
| 2012/0191716 A1 | 7/2012 | Omoigui |
| 2015/0112971 A1* | 4/2015 | Wolfram ............... G06F 16/951 |
| | | 707/722 |
| 2020/0081972 A1* | 3/2020 | Majumder ........ G06F 16/90344 |
| 2020/0380021 A1* | 12/2020 | Barbour ................ G06F 16/313 |
| 2021/0365502 A1 | 11/2021 | Hutchins |
| 2022/0138345 A1* | 5/2022 | Krishnan ............... G06N 20/00 |
| | | 726/26 |
| 2022/0156687 A1 | 5/2022 | Shah |
| 2022/0391519 A1* | 12/2022 | Trim .................... G06F 21/602 |
| 2023/0214679 A1* | 7/2023 | Xu ...................... G06F 18/2113 |
| | | 706/47 |
| 2024/0004896 A1* | 1/2024 | Umay .................. G06F 16/211 |

\* cited by examiner

SYSTEMS, METHODS, AND APPARATUSES FOR GENERATING, EXTRACTING, CLASSIFYING, AND FORMATTING OBJECT METADATA USING NATURAL LANGUAGE PROCESSING IN AN ELECTRONIC NETWORK

TECHNOLOGICAL FIELD

The present invention embraces a system for generating, extracting, classifying, and formatting object metadata using natural language processing in an electronic network.

BACKGROUND

Managers of electronic networks have a harder time than ever automatically and dynamically determining object metadata from unstructured datasets in an efficient and consistent manner. Such methods of obtaining metadata are labor intensive, lack consistency, resource intensive, and are expensive. A need, therefore, exists for an automated system to extract and generate object metadata consistently and reliably.

Applicant has identified a number of deficiencies and problems associated with generating, extracting, classifying, and formatting object metadata. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for generating, extracting, classifying, and formatting object metadata using natural language processing in an electronic network is provided. In some embodiments, the automated metadata generation system may comprise a memory device with computer-readable program code stored thereon; at least one processing device, wherein executing the computer-readable code is configured to cause the at least one processing device to: identify at least one input source, wherein the at least one input source comprises at least one input data; parse the at least one input data; output, by an extraction layer, at least one object metadata and a term importance score associated with the input data to a metadata storage, wherein the extraction layer comprises an NLP attribute extraction model; assemble, by an assignment layer, a corpus of text data and key phrases based on the object metadata from the extraction layer, wherein the assignment layer comprises an NLP classification model; classify and verify, by the assignment layer, the object metadata; and output, by a generative layer, at least one generative metadata to the metadata storage, wherein the generative layer comprises a pretrained generative NLP model that is tuned by the object metadata and the term importance score from the extraction layer and the corpus of text data and key phrases from the assignment layer.

In some embodiments, the processing device is further configured to: identify a scraping request; and access, based on the scraping request, at least one noisy descriptive dataset associated with the at least one input source. In some embodiments, the processing device is further configured to parse the at least one input data by: receiving the at least one input data, the at least one input data comprising the at least one noisy descriptive dataset based on the scraper request; separating the at least one noisy descriptive dataset into at least one small unstructured dataset unit, the at least one small unstructured dataset unit comprising at least one of a paragraph or a sentence; removing at least one syncategorematic term and at least one special character from the at least one small unstructured dataset unit wherein the at least one small unstructured dataset has been parsed into a preprocessed dataset unit; and outputting the at least one preprocessed dataset unit to the NLP attribute extraction model of the extraction layer for further processing.

In some embodiments, an input to the input source further comprises previously generated metadata.

In some embodiments, the extraction layer receives at least one preprocessed dataset unit and extracts the object metadata and term importance score by: performing text identification of the at least one preprocessed dataset unit by identifying at least one sentence and selecting at least one candidate metadata term of the at least one preprocessed dataset unit, wherein the at least one candidate metadata term consists of at least one word; representing the at least one candidate metadata term with at least one feature; scoring the at least one candidate metadata term based on the at least one feature; assigning the term importance score to the at least one candidate metadata term; creating a list of at least one candidate metadata term in order of term importance score rankings; and outputting the list of at least one candidate metadata term as object metadata with its corresponding term importance score to the metadata storage.

In some embodiments, the assignment layer will be trained by metadata that the assignment layer receives from the extraction layer, and wherein the assignment layer assigns the object metadata to at least one object description.

In some embodiments, the processing device is further configured to: generate, based on the object metadata of the extraction layer and the generative metadata of the generative layer, a metadata interface component comprising the object metadata, the generative metadata, and the term importance score; and transmit the metadata interface component to a user device, wherein the metadata interface component configures a graphical user interface of the user device.

In some embodiments, the processing device is further configured to: receive an input from the metadata interface component, wherein the input will represent either approval or disapproval of the object metadata or the generative metadata; train the NLP classification model of the assignment layer using the input from the graphical user interface input source; and tune the pretrained generative NLP model of the generative layer using the input from the graphical user interface input source.

In another aspect, a computer program product for generating, extracting, classifying, and formatting object metadata using natural language processing in an electronic network is provided. In some embodiments, the computer program product comprises at least one non-transitory computer-readable medium having computer-readable program code portions embodied therein, the computer readable program code portion which when executed by a processing device are configured to cause a processor to: identify at least one input source, wherein the at least one input source comprises at least one input data; parse the at least one input data; output, by an extraction layer, at least one object metadata and a term importance score associated with the input data to a metadata storage, wherein the extraction layer comprises an NLP attribute extraction model; assemble, by an assignment layer, a corpus of text data and key phrases based on the object metadata from the extraction layer and classify and verify the object metadata, wherein the assignment layer comprises an NLP classification model; and output, by a generative layer, generative metadata to the metadata storage, wherein the generative layer comprises a pretrained generative NLP model that is tuned by the object metadata and the term importance score from the extraction layer and the corpus of text data and key phrases from the assignment layer.

In some embodiments, the processing device is further configured to cause the processor to: identify a scraping request; and access, based on the scraping request, at least one noisy descriptive dataset associated with the at least one input source. In some embodiments, the processing device is further configured to parse the at lease one input data by: receiving the at least one input data, the at least one input data comprising the at least one noisy descriptive dataset based on the scraper request; separating the at least one noisy descriptive dataset into at least one small unstructured dataset unit, the at least one small unstructured dataset unit comprising at least one of a paragraph or a sentence; removing at least one syncategorematic term and at least one special character from the at least one small unstructured dataset unit wherein the at least one small unstructured dataset has been parsed into a preprocessed dataset unit; and outputting the at least one preprocessed dataset unit to the NLP attribute extraction model of the extraction layer for further processing.

In some embodiments, the extraction layer receives at least one preprocessed dataset unit and extracts the object metadata and term importance score by: performing text identification of the at least one preprocessed dataset unit by identifying at least one sentence and selecting at least one candidate metadata term of the at least one preprocessed dataset unit, wherein the at least one candidate metadata term consists of at least one word; representing the at least one candidate metadata term with at least one feature; scoring the at least one candidate metadata term based on the at least one feature; assigning the term importance score to the at least one candidate metadata term; creating a list of at least one candidate metadata term in order of term importance score rankings; and outputting the list of at least one candidate metadata term as object metadata with its corresponding term importance score to the metadata storage.

In some embodiments, the computer-readable code is configured to cause the at least one processing device to perform the following operations: generate, based on the object metadata of the extraction layer and the generative metadata of the generative layer, a metadata interface component comprising the object metadata and the generative metadata and the term importance score; and transmit the metadata interface component to a user device, wherein the metadata interface component configures a graphical user interface of the user device.

In some embodiments, the processing device is further configured to: receive an input from the metadata interface component, wherein the input will represent either approval or disapproval of the object metadata or the generative metadata; train the NLP classification model of the assignment layer using the input from the graphical user interface input source; and tune the pretrained generative NLP model of the generative layer using the input from the graphical user interface input source.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
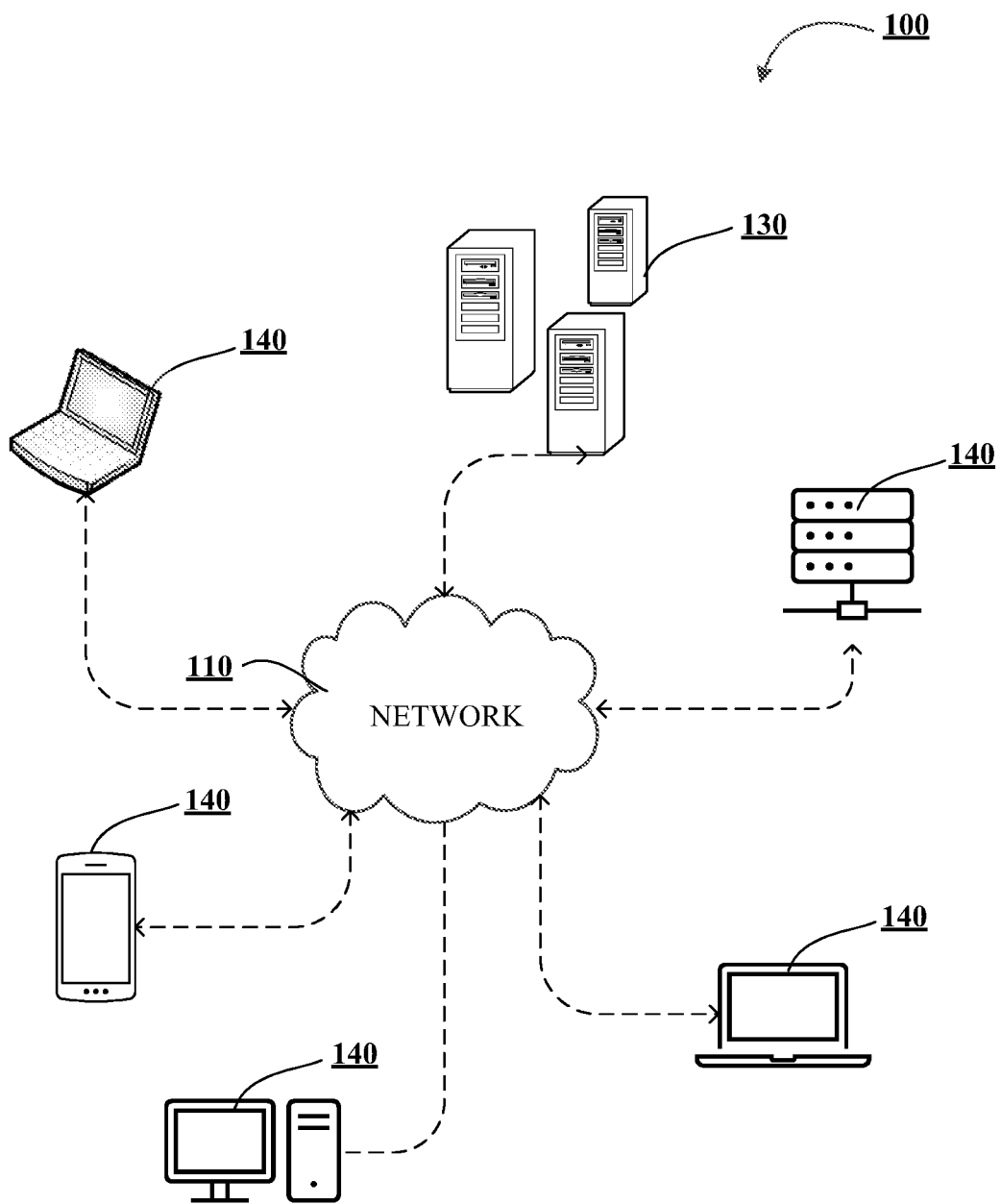
Figure 1B:
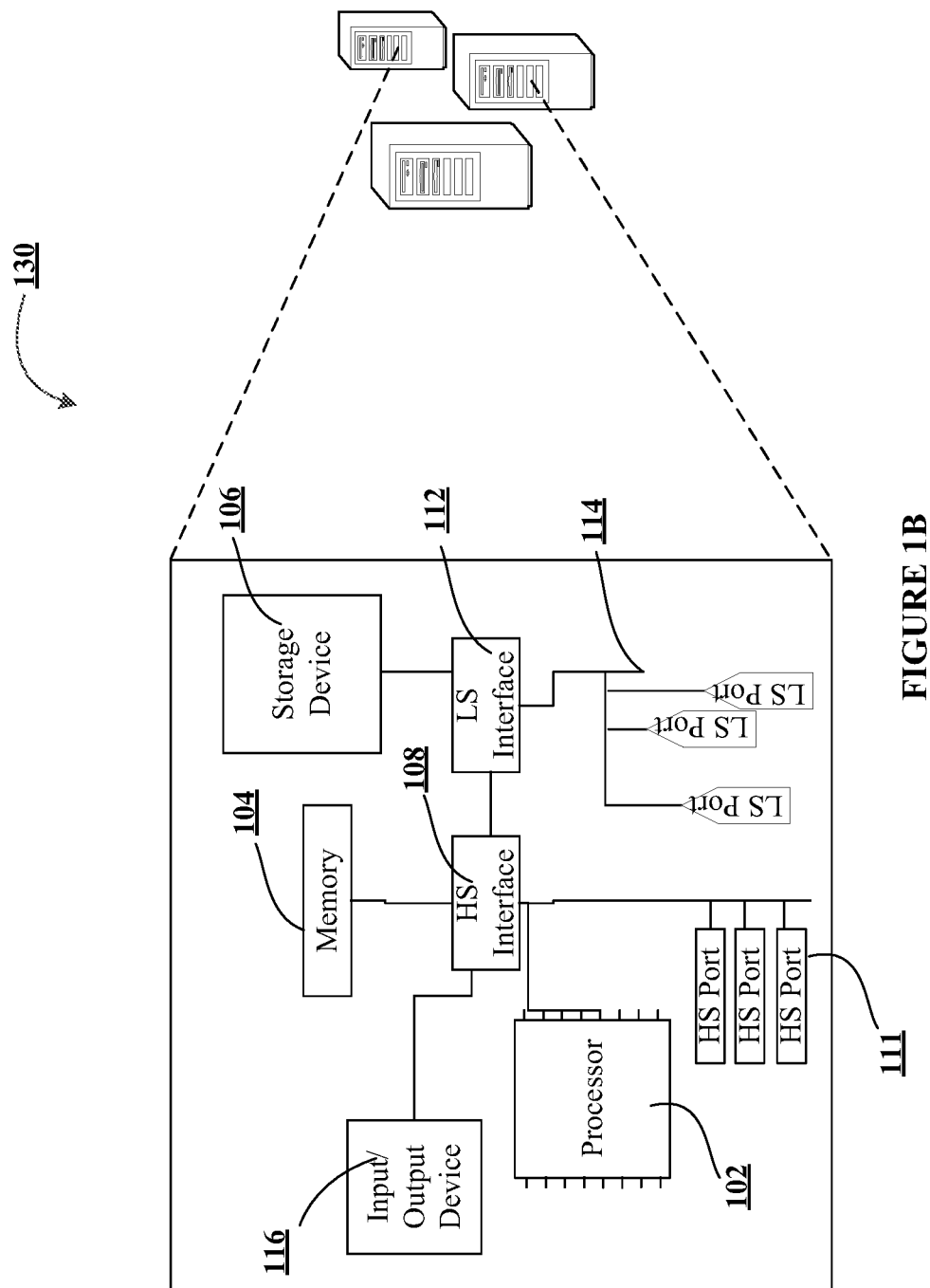
Figure 1C:
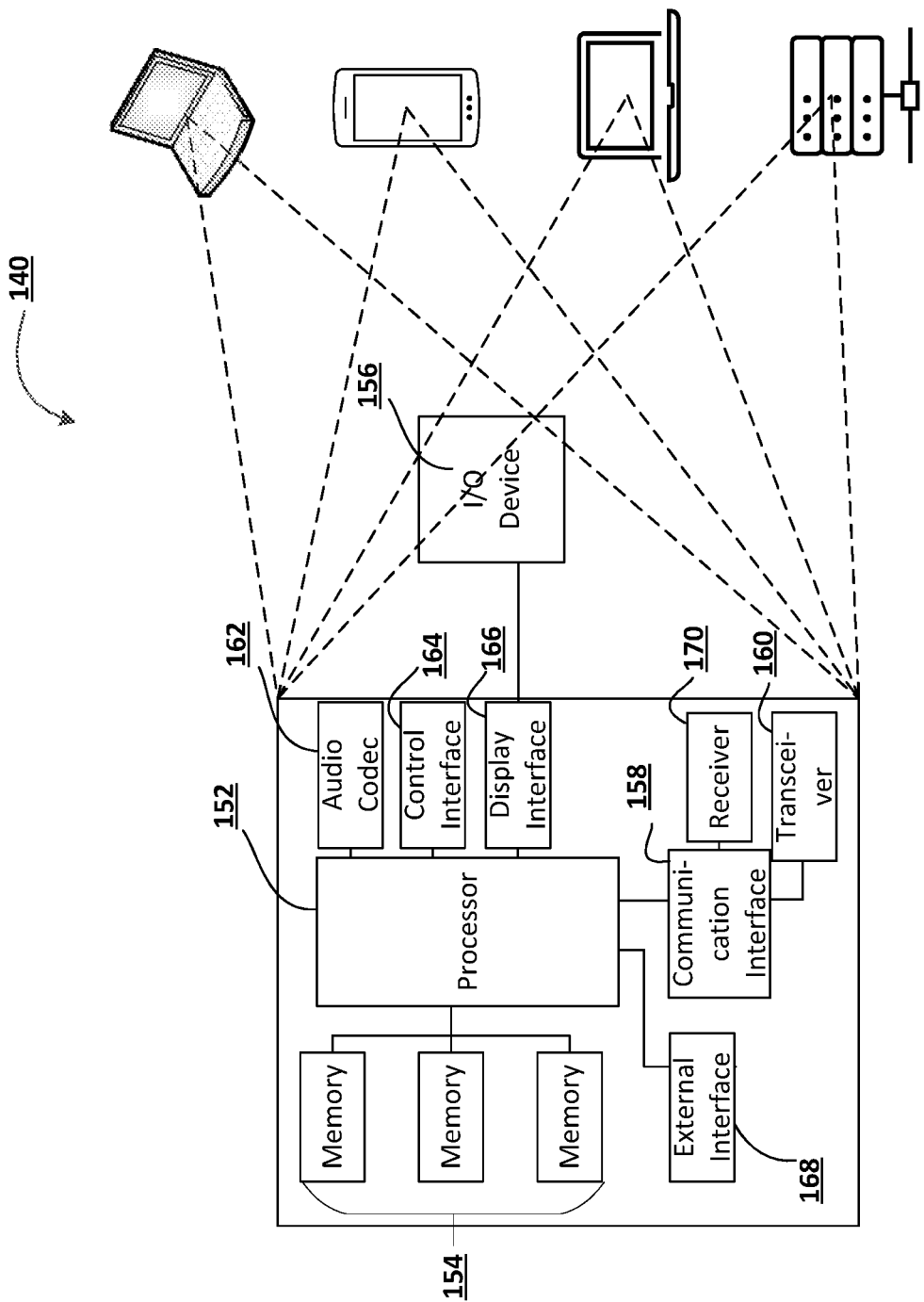
Figure 2:
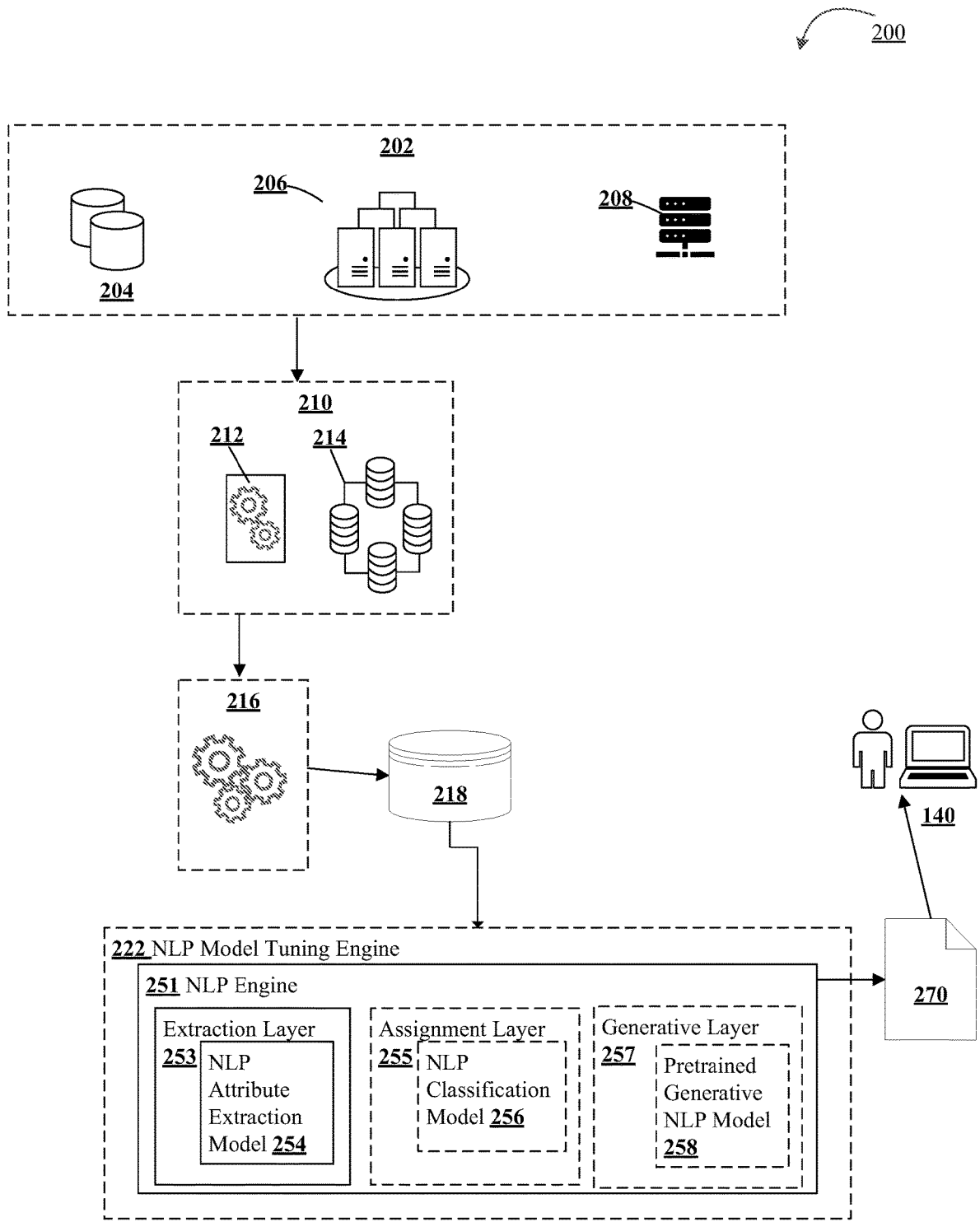
Figure 3:
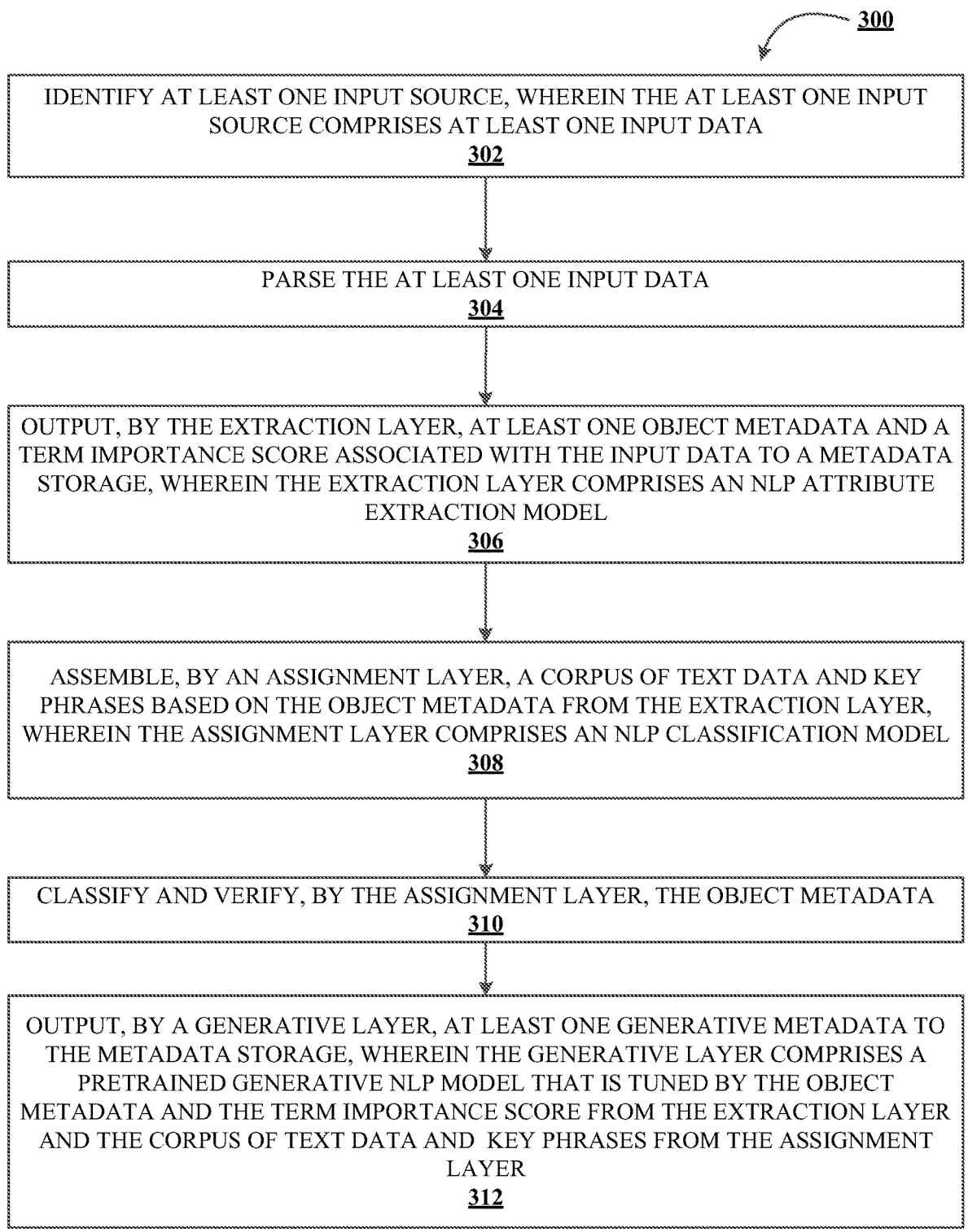
Figure 4:
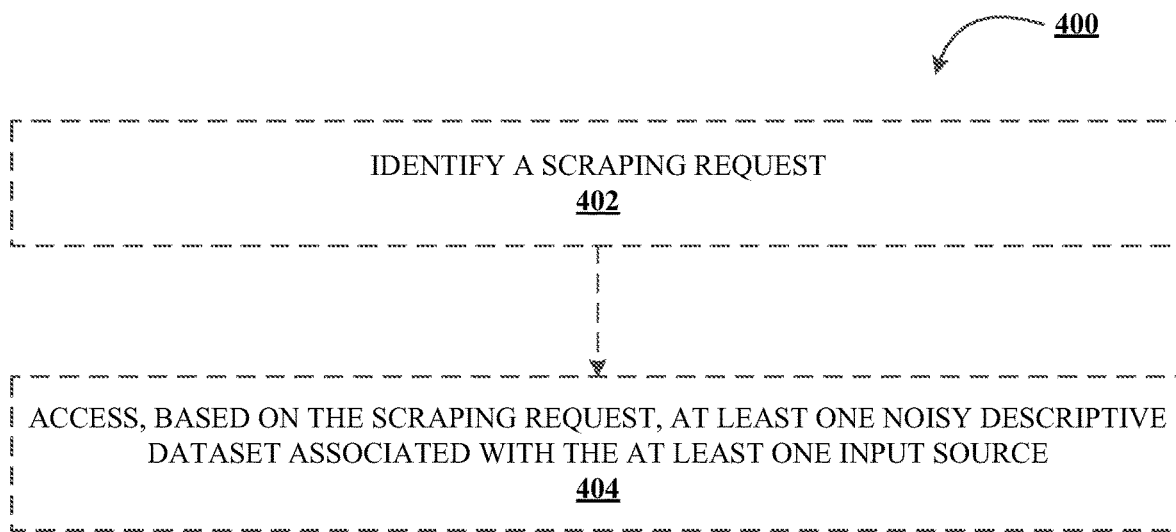
Figure 5:
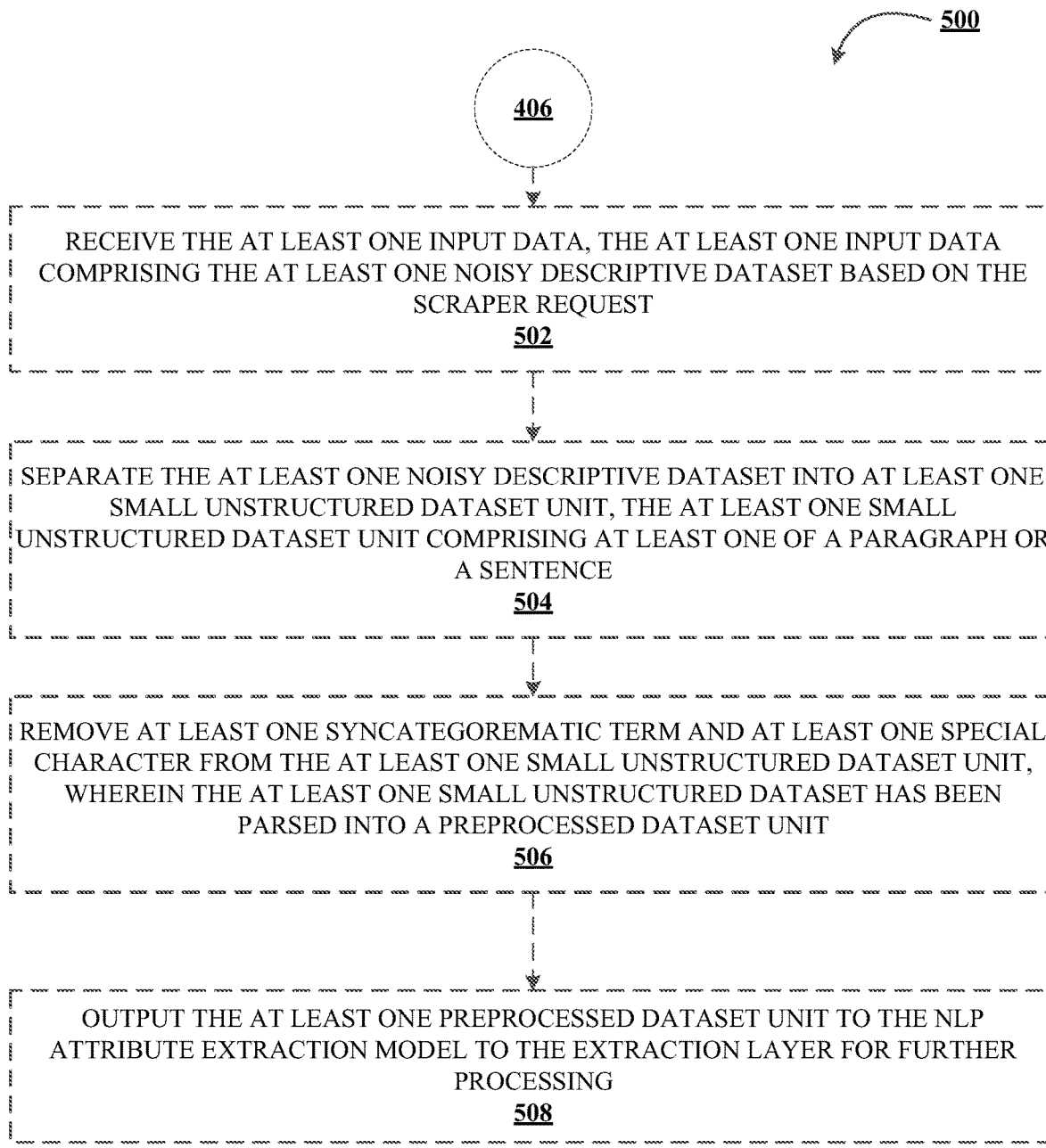
Figure 6:
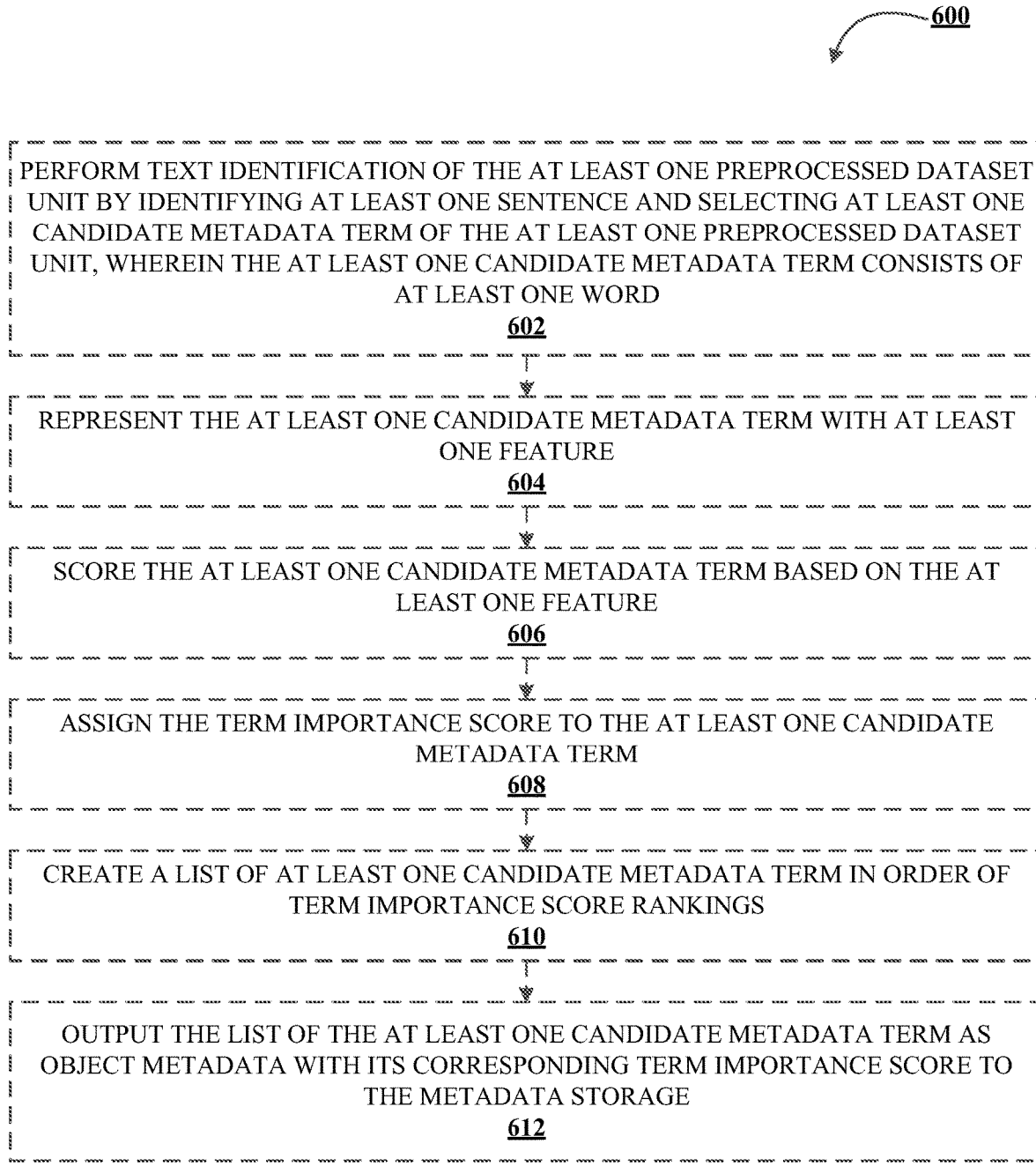
Figure 7:
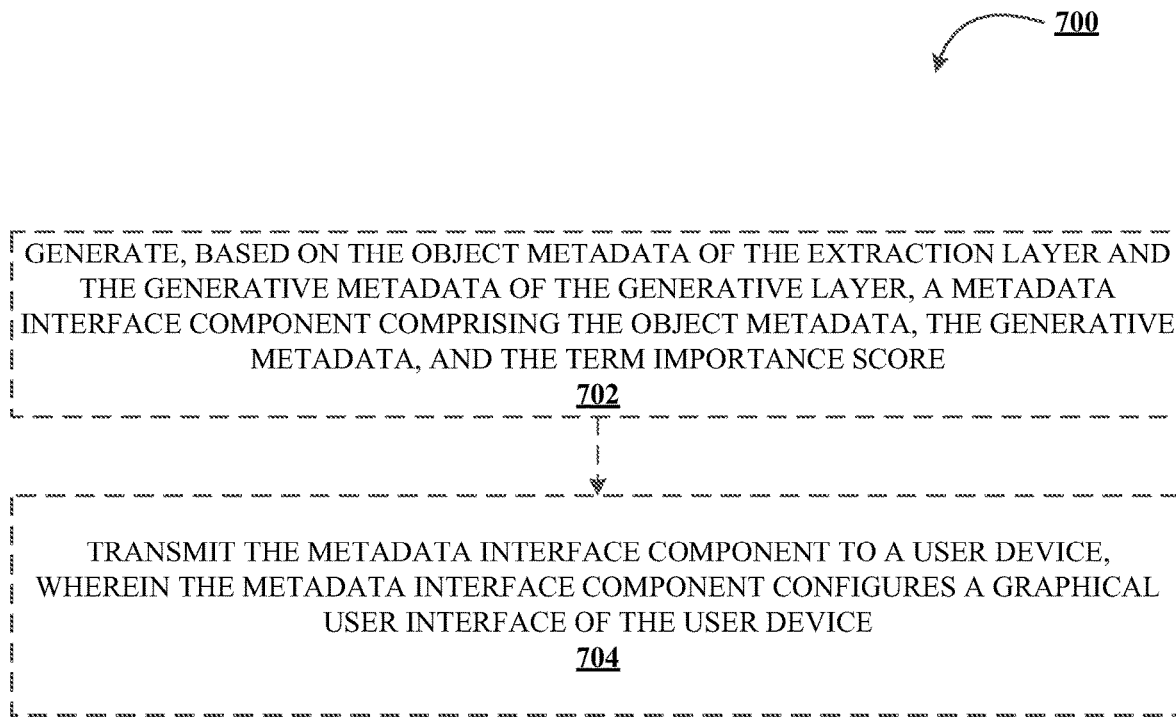
Figure 8:
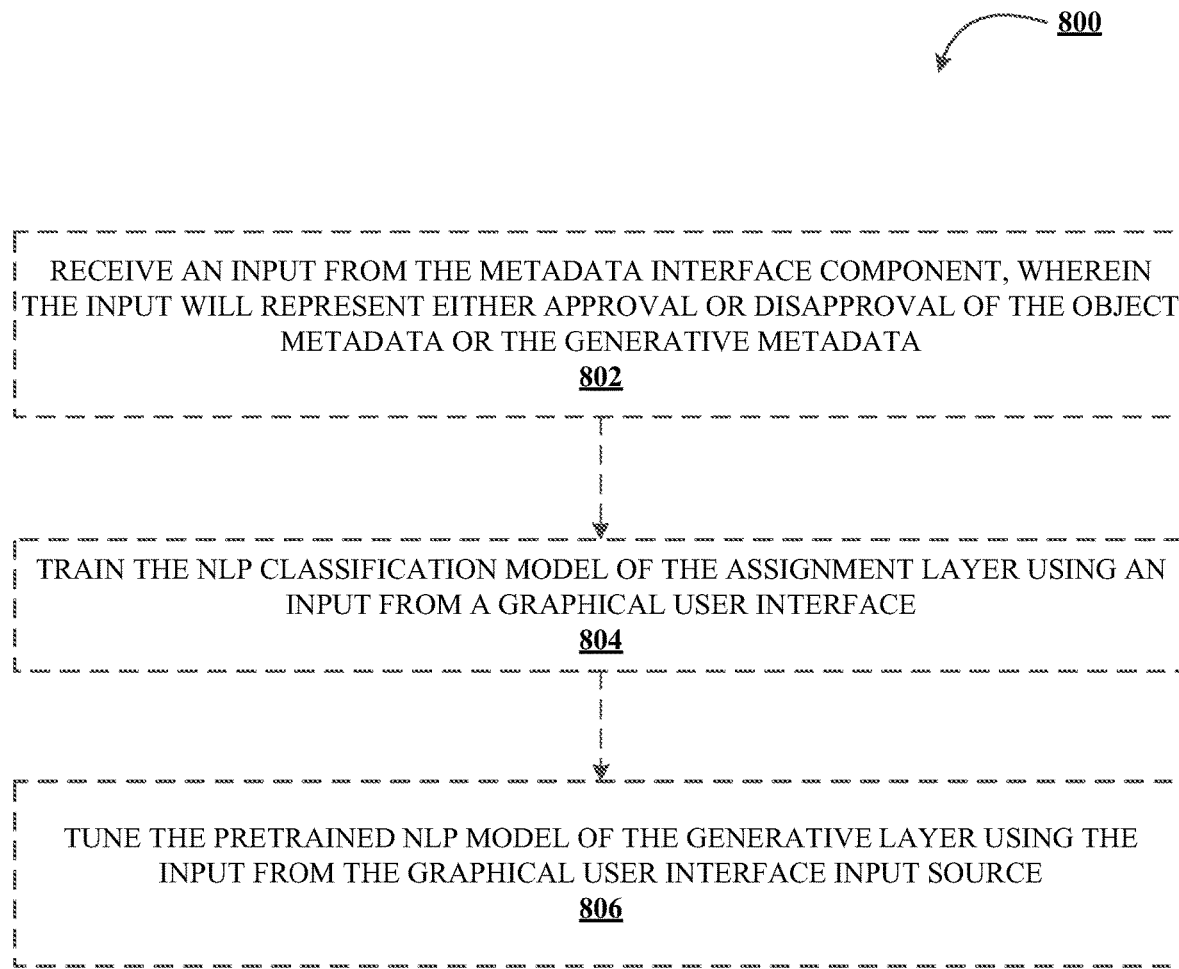

FIGS. 1A-1C illustrates technical components of an exemplary distributed computing environment for generating, extracting, classifying, and formatting product metadata using natural language processing, in accordance with an embodiment of the invention;

FIG. 2 illustrates an exemplary Natural Language Processing (NLP) subsystem architecture, in accordance with an embodiment of the disclosure;

FIG. 3 illustrates a process flow for generating, extracting, classifying, and formatting object metadata using natural language processing, in accordance with an embodiment of the disclosure;

FIG. 4 illustrates a process flow for accessing at least one noisy descriptive dataset, in accordance with an embodiment of the disclosure;

FIG. 5 illustrates a process flow for preparing the at least one noisy descriptive dataset for the extraction layer, in accordance with an embodiment of the disclosure;

FIG. 6 illustrates a process flow for extracting object metadata along with its corresponding term importance score, in accordance with an embodiment of the disclosure;

FIG. 7 illustrates a process flow for generating and transmitting the metadata interface component, in accordance with an embodiment of the disclosure; and FIG. 8 illustrates a process flow for training the classification model and tuning the generative model using input from the metadata interface component, in accordance with an embodiment of the disclosure.

DETAILED DESCRIPTION OF EMBODIMENTS OF THE INVENTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, this data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a a automated metadata generation system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the automated metadata generation system may be owned or operated by an entity. In such embodiments, the entity may employ additional computer systems, such as authentication servers, to validate and certify resources inputted by the plurality of users within the automated metadata generation system. The system may further use its authentication servers to certify the identity of users of the automated metadata generation system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the automated metadata generation system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Managers of electronic networks have a harder time than ever obtaining object metadata (such as data regarding products and/or services) in an efficient and consistent manner. For instance, metadata is typically acquired from third party vendors. Such methods of obtaining metadata lack consistency and are expensive. Further, the process of manually obtaining or creating metadata is labor intensive. A need, therefore, exists for an automated system to extract and generate object metadata consistently and reliably.

As described in further detail herein, the present invention provides a solution to the above-referenced problems in the field of technology by generating an automated system to consistently and reliably extract and generate object metadata. Such an automated metadata generation system solves at least the technical problems in consistently generating object metadata through a uniform method; inexpensively extracting object metadata from object descriptive data; and automatically creating metadata without labor intensive methods. Such an automated metadata generation system, thus, may solve the above-identified problems by at least identifying an input source which will provide input data wherein the input data can be acquired from a scraping request or previously generated metadata. Based on the received input data, the automated metadata generation system may parse the input data and either store the input data to metadata storage or further provide the input data to a custom NLP pipeline. The custom NLP pipeline may consist of an NLP attribute extraction model that may extract object metadata and a term importance score from the parsed input data and output the object metadata and term importance score to metadata storage. The custom NLP pipeline may also consist of an NLP classification model that may assemble a corpus of text data and key phrases based on the object metadata from the extraction layer. The corpus may be used to classify and verify the extracted object metadata and to tune a pretrained generative NLP model that can generate object metadata without the need for any descriptive data from an input source.

Accordingly, the present disclosure provides an automated metadata generation system that utilizes artificial intelligence for extracting object metadata (i.e. attributes, features, tags, and categories that define an object, such as a merchant, a merchant's product, a service, and/or the like). For instance, a scraping request can be sent to a Scraper Service to obtain public data concerning a merchant. This public data then undergoes preprocessing and/or end-to-end custom NLP (Natural Language Processing) to obtain object metadata. In some embodiments the NLP procedure involves an extraction phase that can run independent of the rest of the NLP pipeline. Additionally, in some embodiments, the NLP procedure also involves a classification phase and a generative phase that will learn from the extraction phase for improved future output. Once the metadata enters the metadata storage, a human can review the metadata for accuracy as well as legal issues. This human guidance will further help teach the NLP rules that it will later be able to apply by itself.

What is more, the present disclosure provides a technical solution to a technical problem. As described herein, the technical problem includes consistent and reliable extraction and generation of object metadata. The technical solution presented herein allows for an automated metadata generation system provides the consistent and reliable extraction and generation of object metadata. In particular, the automated metadata generation system is an improvement over existing solutions to the generation of object metadata, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution (especially with respect to analyzing and organizing unstructured data from input sources into object metate stored in metadata storage), (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for generating, extracting, classifying, and formatting object metadata using natural language processing in an electronic network 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the automated metadata generation system s, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary Natural Language Processing (NLP) subsystem architecture 200, in accordance with an embodiment of the disclosure. The NLP subsystem 200 may include a data acquisition engine 202, data ingestion engine 210, data pre-processing engine 216, NLP model tuning engine 222, inference engine 236, and NLP model/engine 251. Specific embodiments of the disclosure also provide for an extraction layer 253 comprising an NLP attribute extraction model 254, an assignment layer 255 comprising an NLP classification model 256, and a generative layer 257 comprising a pretrained generative NLP model 258.

The data acquisition engine 202 may identify various internal and/or external data sources to generate, test, and/or integrate new features for training the NLP engine 251 (such as by gathering at least one unstructured datasets like that shown in as datasets 206). In some embodiments, and as shown in FIG. 2, NLP engine 251 may comprise an NLP pipeline comprising multiple NLP models/engines, such as an NLP attribute extraction model 254, an NLP classification model 256, and a pretrained generative NLP model, which are each configured for specific purposes and data analyzation and data inputs/outputs. Further, these internal and/or external data sources 204, 206, and 208 may be initial locations where the data originates or where physical information is first digitized (such as within a database, such as a database of previous generated metadata, previously generated documents regarding object descriptions, previous classifications of metadata, and/or the like). The data acquisition engine 202 may identify the location of the data and describe connection characteristics for access and retrieval of data.

In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include databases associated with object descriptions, metadata storage, data repositories, documents with structured and classified object metadata that was previously generated (i.e., previously generated metadata) and/or unstructured data (e.g., from websites, webpages, web documents, images, text data from sound recordings, and/or the like, which may have been extracted using a scraper service/web-scraper). In some embodiments, the data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. For instance, and where the input data comprises a title of a webpage, a subtitle, a genre, and/or the like, the data ingestion 210 may transmit the data directly to a metadata storage as object metadata. Typically, the data imported from the data acquisition engine 202 may be in varying formats as they come from different sources, including RDBMS, other types of databases, S3 buckets, CSVs, or from streams. In some embodiments, and since the data may come from different places, it may need to be cleansed and transformed so that it can be analyzed together with data from other sources, such as by cleansing the data of non-important text such as periods (".") and/or the like. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In natural language processing, the quality of data and the useful information that can be derived therefrom directly affects the ability of the natural language processing engine 251 (and its associated NLP models 254, 256, and 258). The data pre-processing engine 216 may implement advanced integration and processing steps needed to prepare the data for NLP execution. This may include modules to perform any upfront, data transformation to consolidate the data into alternate forms by changing the value, structure, or format of the data using generalization, weightage values, fuzzy the terms of the unstructured datasets, normalization, and aggregation, data cleaning, smoothing noisy data, resolving inconsistency(ies), and removing outliers, and/or the like.

In addition to improving the quality of the data, the data pre-processing engine 216 may implement feature extraction and/or selection techniques to generate training data 218. In some embodiments, the training data 218 may comprise pre-labeled object metadata, features, classifications, term importance scores, attributes, generative metadata, object descriptions (e.g., which may comprise tokenized data, stemmed data, lemmatization, the removal of symbols, sentence parsers, and/or normalizations), general object descriptions, and/or the like. Further, and in some embodiments, the training data 218 may be pre-labeled by users associated with the business team of a client of the automated metadata generation system, the legal team of the client of the automated metadata generation system, the information technology (IT) team of the client, and/or the like. Feature extraction and/or selection is a process of dimensionality reduction by which an initial set of data is reduced to more manageable groups for processing. In some embodiments, the training data 218 may require further enrichment. For example, in supervised learning, the training data is enriched using one or more meaningful and informative classifications and term importance scores to provide context so the NLP engine 251 (NLP models 254, 256, 258) can learn from it. In contrast, unsupervised learning uses unlabeled data to find patterns in the data, such as inferences or clustering of data points, such as by being trained on non-labeled object metadata, classifications, term importance scores, and/or the like.

An NLP engine tuning engine 222 may be used to train the NLP engine 251 using the training data 218 to make predictions or decisions without explicitly being programmed to do so. The NLP engine 251 (NLP models 254, 256, 258) represents what was learned by a selected machine learning algorithm 220 and represents the rules, numbers, and any other algorithm-specific data structures required for classification.

In some embodiments, the NLP engine 251 (NLP models 254, 256, 258) may include machine learning supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

The extraction layer 253, comprising the NLP attribute extraction model 254, where the NLP attribute extraction model is configured to (1) determine parts of speech/text data of the input data from the input source(s), (2) determine object metadata and associated entities (such as names of objects, such as merchant names, and/or the like), and (3) extract input data to generate the object metadata and associated term importance scores. Similarly, the assignment layer 255, comprising the NLP classification model 256, may be configured to (1) build a corpus of text data and key phrases, (2) determine features of the text data and key phrases, and (3) refine the NLP models (e.g., including the NLP attribute extraction model 254 and the pre-trained generative NLP model 258) using machine learning techniques. Lastly, and in some embodiments, the generative layer 257, comprising the pretrained generative NLP model 258, may be configured to tune, retune, and/or refine the pre-trained generative NLP model based on a generative algorithm by generating and/or identifying object metadata from multiple input sources where the object metadata may not explicitly be stated. Such a pre-trained generative NLP model 258 may be used on its own after extensive training with data described herein.

To tune the NLP engine 251 (NLP models 254, 256, 258), the NLP tuning engine 222 may repeatedly execute cycles of experimentation, testing, and tuning to optimize the performance of the NLP engine 251 (NLP models 254, 256, 258) and refine the results in preparation for deployment of those results for consumption or decision making. To this end, the NLP tuning engine 222 may vary hyperparameters each iteration, run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained NLP engine 251 (NLP models 254, 256, 258) is one whose hyperparameters are tuned and accuracy maximized.

The trained NLP engine 251 (NLP models 254, 256, 258), similar to any other software application output, can be persisted to storage, file, memory, or application, or looped back into the processing component to be reprocessed. More often, the trained NLP engine 251 (NLP models 254, 256, 258) is deployed into an existing production environment to make accurate decisions on unstructured data based on live data (e.g., unstructured datasets and input data). For instance, such an unstructured dataset/a plurality of future unstructured datasets may be input to the training NLP engine 251 (which includes parsing the terms of the unstructured dataset(s), determining the meaning of each of the object descriptions, object metadata, term importance scores, generative metadata, and/or the like. Further, and based on the structured dataset generated by the trained NLP engine 251 (NLP models 254, 256, 258), the computer language interpretation system may generate an interface component (e.g., a metadata interface component, and/or the like).

Thus, and based on the generated interface components, the system may receive user inputs from the user device(s) 140 after deploying the interface components to show the user(s) of the user device(s) 140 at least the object metadata, the generative metadata, and/or the term importance scores. Such user inputs may then be transmitted back to the NLP engine 251 (NLP models 254, 256, 258) for further training (e.g., by way of the training data 218).

It will be understood that the embodiment of the NLP subsystem 200 illustrated in FIG. 2 is exemplary and that other embodiments may vary. As another example, in some embodiments, the NLP subsystem 200 may include more, fewer, or different components.

FIG. 3 illustrates a process flow 300 for generating, extracting, classifying, and formatting object metadata using natural language processing, in accordance with an embodiment of the invention. In some embodiments, a automated metadata generation system (e.g., similar to one or more of the automated metadata generation system s described herein with respect to FIGS. 1A-1C and 2) may perform one or more of the steps of process flow 300. For example, an automated metadata generation system (e.g., the automated metadata generation system 130 described herein with respect to FIG. 1A-1C) may perform the steps of process flow 300.

As shown in block 302, the process flow 300 may include the step of identifying at least one input source, wherein the at least one input source comprises at least one input data. For instance, the automated metadata generation system may identify at least one input source, or a plurality of input sources, comprising at least one input data. In some embodiments, the at least one input data may comprise text data, numerical data, image data, and/or the like.

As used herein, the term input source may refer to website, application, webpage, a client-provided source, an image or graphic, and/or the like. In some embodiments, and based on whether the input source is a website and/or webpage, the input source may comprise the pre-processed data of the website and/or webpage, such as the data after the website and/or webpage has been web-scraped. Thus, the input data of the input source may comprise the extracted data of the input source that has not yet been pre-processed, whereby such input data may comprise a document, an image, a paragraph, a sentence, a webpage's text data, a sound or recording that is converted to text data, and/or the like. In any of these instances of what the input data may comprise the input data may be an unstructured text dataset. Such data of the input source may then be received by the system for pre-processing and parsing, like the process described hereinbelow with respect to block 304.

In some embodiments, the input data of the input source may comprise a previously generated metadata. For instance, and where the system is in communication with a database and/or index of previously generated object metadata (e.g., descriptions of an object), the automated metadata generation system may automatically use the object metadata previously created as the input data. For example, a previously generated metadata may have been generated manually by a user of the client of the automated metadata generation system, such as but not limited to a business team user, an information technology (IT) user, a legal team user, and/or the like that was tasked with generating object metadata to describe an object. In some embodiments, such previously generated metadata may be used to train the NLP engine(s) initially, but such issues may arise where the previously generated metadata are each user-specific and have their own ways to describe the object, which may not be a standard or universal across different users associated with the client. Thus, such previously generated metadata may, in some embodiments, only be used initially for training.

As shown in block 304, the process flow 300 may include the step of parsing the at least one input data. As used herein, NLP "model" and NLP "engine" may be used interchangeably and refer to the same components. In some embodiments, the at least on input data may undergo NLP preprocessing before undergoing further processing by the NLP attribute extraction model (which is described in further detail below). Such preprocessing may comprise tokenizing, stemming, lemmatizing, removing symbols, detector sentences, and/or normalizing. In some embodiments, the at least one input data may comprise subtitle or genre metadata which may be stored directly to metadata storage. For example, and where the parsed input data is clear enough to describe the object, the automated metadata generation system may transmit the specific input data directly to the metadata storage. Such input data may comprise titles on a webpage, subtitles on a webpage, and/or genre titles of an object. As used herein, and as understood by a person of skill in the art, the above examples are not meant to limit the embodiment only to webpages for the purpose of subtitle, title, and/or genre metadata, but may be used for each of the input sources herein identified.

As shown in block 306, the process flow 300 may include the step of outputting, by an extraction layer, at least one object metadata and a term importance score associated with the input data to a metadata storage, wherein the extraction layer comprises an NLP attribute extraction model. For instance, the extraction layer may output at least one object metadata and a corresponding term importance score and/or a plurality of object metadata and corresponding term importance scores. As used herein, the term "object" refers to a product, good, service, item for consumption, manufactured article, and/or the like, which may be described either fully, partially, and/or minimally in an input source and within the input data of the input source. In some embodiment, one input source may describe a plurality of objects, and thus, the automated metadata generation system may parse and separate the input datasets of the input source according to each object.

Similarly, and as used herein, the term "object metadata" refers to the metadata and/or description provided from the input source for an object, such as words, term, phrases, sentences, paragraphs, images, text data from sound recordings, and/or the like. In this manner, the object metadata is meant to describe the object it is referring to and, once the object metadata is accurately classified and verified by the assignment layer, the automated metadata generation system may store the descriptions of the object within the metadata storage and/or another such storage subsystem. As used herein, the metadata storage may refer to a database, index, data repository, and/or the like for the object metadata and the term importance score(s) for each object metadata.

As used herein, the term importance score may refer to a value of all the features of a single term, a single word, a single phrase, an attribute, and/or the like, combined to reflect the importance of the term, word, phrase, and/or attribute. For example, the term importance score may comprise a single score indicating the importance of the term, word, phrase, and/or attribute as compared to the other terms, words, phrases, attributes, and/or the like from the input data. For example, and where an object is a restaurant, the terms, words, phrases, and/or attributes with the highest term importance scores may describe the type of restaurant the object is, such as "Italian eatery," "pizza," or "pasta" may be the highest scored phrases or terms from the input data.

In some embodiments, and where the terms comprise a low term importance score, the automated metadata generation system may filter out these terms (or words, phrases, and/or attributes) based on a term importance threshold. Such a term importance threshold may be predetermined by a client of the automated metadata generation system, by a manager of the automated metadata generation system, and/or by the automated metadata generation system itself (such as based on a ratio of term importance scores, where only the bottom 10% may be filtered out from the candidate terms and considered unimportant). In some embodiments, and where the automated metadata generation system itself has determined the term importance threshold and where the term importance threshold is based on ratio of term importance scores, the ratio may comprise but is not limited to percentages of the bottom 5%, the bottom 10%, the bottom 15%, the bottom 20%, the bottom 25%, the bottom 30%, the bottom 35%, the bottom 40%, the bottom 45%, the bottom 50%, and/or the like (and any such percentage therebetween).

Once a term importance score has been generated for each of the candidate terms, then the extraction layer may output a list of terms with their associated term importance scores. Additionally, and based on the output of the extraction layer, the output may be input to an assignment layer (which is described in further detail below).

As shown in block 308, the process flow 300 may include the step of assembling, by an assignment layer, a corpus of text data and key phrases based on the object metadata from the extraction layer, wherein the assignment layer comprises an NLP classification model. In some embodiments, the automated metadata generation system may take the confirmed object metadata of the extraction layer and learn the associations between object descriptions of the input data and object metadata. For example, the object description may be longer forms of text found in input sources, such as websites (e.g., such as a merchant websites) comprising input data like a paragraph a restaurant uses to describe itself on its website. Based on this input data, the object metadata would be single word(s) or phrase(s) extracted from that paragraph that may be relevant (e.g., based on term importance scores) to describing the restaurant.

In various embodiments, the assignment layer may be placed sequentially after the extraction layer, such that the output of the extraction layer is automatically fed/input to the assignment layer, which comprises an NLP classification model. Further, and shown herein, the assignment layer may be trained by the metadata that the assignment layer receives from the extraction layer, and the assignment layer may assign the object metadata to at least one object description (e.g., may classify some object metadata to an object description, such as an object description stored within the automated metadata generation system and/or stored within the metadata storage).

As used herein, the NLP classification model refers to an NLP engine configured to assemble and/or organize a corpus of text data and key phrases (from the object metadata), and to classify each of the corpuses of text data and key phrases individually and/or as combinations. Similarly, the corpus of text data may refer to individual pieces of text data and/or individual combinations of text data as words, letters, numbers, sentences, and/or the like. As used herein, key phrases may refer to the most relevant phrases in describing the object (e.g., restaurant based on the example provided above) of the object metadata. Such key phrases may be a descriptor of the object, a geolocation of the object, a contact information for the object, a menu item of the object, and/or the like.

As shown in block 310, the process flow 300 may include the step of classifying and verifying, by the assignment layer, the object metadata. In some embodiments, the assignment layer will assign object metadata to the object description and/or the assignment layer will assign the object description to the object metadata. For example, the assignment layer may work both ways, in that the assignment layer may take the object metadata extracted from the input source and may assign and classify certain portions of the object metadata to the object description for the object and/or the assignment layer may additionally and/or alternatively use pre-defined object descriptions/classifiers (e.g., a definition of the object may be a classification, a title of the object may be a classification, a contact for the object may be a classification, a geographical location may be classification, and/or the like) and assign the classifications to the object metadata.

As used herein, the classification by the assignment layer may comprise a cataloguing, an organization, categorization, and/or a sorting of the object metadata to certain classification types (e.g., definition of an object, title, contact information, geographical location, menu item(s) where applicable, service type where applicable, and/or the like). In some embodiments, the classifications may comprise a sorting of the object metadata to pre-generated classifications based on the text data and/or the key phrases of the object metadata (e.g., based on identifying certain key phrases or text data, such as the identification of a key phrase such as "restaurant" may indicate that a classification such as "menu item" should be used). In some embodiments, the verification process may comprise a confirmation of the classifications for the object metadata, whereby such a confirmation may be from the NLP classification model, from a client of the automated metadata generation system (or from a user of the client of the automated metadata generation system, such as a user from a business team of the client, a user of the legal team of the client, and/or the like), from a manager of the automated metadata generation system, and/or the like.

As shown in block 312, the process flow 300 may include the step of outputting, by a generative layer, at least one generative metadata to the metadata storage, wherein the generative layer comprises a pretrained generative NLP model that is tuned by the object metadata and the term importance score from the extraction layer and the corpus of text data and key phrases from the assignment layer. In some embodiments, after being tuned by the extraction layer and the assignment layer, the generative layer will produce new object metadata without the need for descriptive data. In other words, and in some embodiments, the generative layer, after enough time has passed where the pretrained generative NLP model has been trained by the other layers (e.g., the assignment layer and the extraction layer) and user input, the generative layer would be able to generate its own metadata terms without those terms being in a product description originally (e.g., as previous object metadata and text data/key phrases). For example, the generative layer would comprise an algorithm that could generate restaurant metadata (e.g., a description such as "soul food") from southern style menus where the input data does not contain the metadata generated (e.g., "soul food" explicitly).

In some embodiments, the generative layer, like that described herein, may be placed in sequential order after the assignment layer, such that the output of the assignment layer may be input to the generative layer. However, and additionally and/or alternatively, the output of the extraction layer (e.g., the object metadata and associated term importance scores) may be input directly to the generative layer as well. In this manner, the tuning and training the of the generative layer may be conducted based on the other outputs of the NLP models/engines.

FIG. 4 illustrates a process flow 400 for accessing at least one noisy descriptive dataset, in accordance with an embodiment of the invention. In some embodiments, an automated metadata generation system (e.g., similar to one or more of the automated metadata generation system s described herein with respect to FIGS. 1A-1C and 2) may perform one or more of the steps of process flow 400. For example, an automated metadata generation system (e.g., the automated metadata generation system 130 described herein with respect to FIG. 1A-1C) may perform the steps of process 400.

In some embodiments, and as shown in block 402, the process flow 400 may include the step of identifying a scraping request. In some embodiments, the scraping request may be received and/or identified once it is generated from a client of the automated metadata generation system, a manager of the automated metadata generation system, and/or by the automated metadata generation system itself. For instance, the automated metadata generation system may identify an object that does not have any object metadata to describe it (e.g., may recognize a hole in its data storage of object metadata and/or the generative metadata to describe an object).

In some embodiments, a web-crawler may be implemented at predefined intervals, such that the web-crawler can determine whether new and/or recent input data has been generated since the last web-crawler was implemented. Based on the identification of new or recent input data, the automated metadata generation system may identify a scraping request to scrape the new or recent input data to extract the new or recent input data to generate object metadata.

In some embodiments, and based on the scraping request, the automated metadata generation system may implement a web-crawler to identify input sources that should have its data extracted. In this manner, the object metadata will come from the object descriptions from the input sources that the web-crawler has moved through, and a web-scraper has extracted from to generate the object descriptions (e.g., the pre-processed and pre-parsed input data).

As used herein, a web-crawler may crawl through and finding or discovering data from the input sources, including text data, image data, text data from sound recordings, and/or the like. For example, a web-crawler may crawl through URLs/websites to access metadata (e.g., the input sources and associated object descriptions/input data), and based on the scraping request, a web-scraper may extract the object metadata from each input source.

In some embodiments, and as shown in block 404, the process flow 400 may include the step of accessing, based on the scraping request, at least one noisy descriptive dataset associated with the at least one input source. As used herein, this noisy descriptive dataset may comprise text data, numerical data, image data, and/or the like, from the web-scraper, whereby such noisy descriptive datasets may comprise all the non-relevant terms, words, letters, punctuation, and/or the like and the potentially relevant terms such as words, letters, punctuation, and/or the like to describe the object. In other words, the noisy descriptive data refers to the data from an input source before it has undergone any preprocessing or processing directly from the scraper service. Thus, the noisy descriptive data may be the object description before it has been processed at all for any of the NLP models/engines.

In some embodiments, the at least one noisy descriptive dataset must be preprocessed before reaching the extraction layer in order to extract effective object metadata (e.g., the likely relevant metadata to describe the object, without the irrelevant data, such as irrelevant punctuation and/or the like).

FIG. 5 illustrates a process flow 500 for preparing the at least one noisy descriptive dataset for the extraction layer, in accordance with an embodiment of the invention. In some embodiments, an automated metadata generation system (e.g., similar to one or more of the automated metadata generation system s described herein with respect to FIGS. 1A-1C and 2) may perform one or more of the steps of process flow 500. For example, an automated metadata generation system (e.g., the automated metadata generation system 130 described herein with respect to FIG. 1A-1C) may perform the steps of process 500.

In some embodiments, and as shown in block 502, the process flow 500 may include the step of receiving the at least one input data, the at least one input data comprising the at least one noisy descriptive dataset based on the scraper request, such as by the process described above with respect to process flow 400. Similar to the description provided above, the noisy descriptive data refers to the non-preprocessed input data, which has not undergone any pre-processing and has not yet been processed by any of the NLP engines described herein. Such noisy descriptive data may thus be received by the automated metadata generation system based on the scraping request, the web-crawler, and the web-scraper described hereinabove with respect to FIG. 4.

In some embodiments, the at least one input data may consist of text data that can already be sent to metadata storage as object metadata. In other embodiments, the at least one input data comprising at least one noisy descriptive dataset may undergo preprocessing before being consumed by the NLP attribute extraction model. For example, the preprocessing of the noisy descriptive dataset may only need to undergo minimal processing to be object metadata. In this manner, some noisy descriptive data may be clear enough that the noisy descriptive data can become objective data and can automatically be stored in the metadata storage for the object it describes. For instance, and where the noisy descriptive data is a title of a webpage associated with an object, the automated metadata generation system may determine the title does not need to undergo preprocessing or processing by any of the NLP engines, and may instead go directly to storage (such as the metadata storage) and stored with an object identifier, wherein the object identifier may comprise a unique alphanumeric string to identify a product, merchant, service, and/or the like, within the automated metadata generation system.

In some embodiments, and as shown in block 504, the process flow 500 may include the step of separating the at least one noisy descriptive dataset into at least one small unstructured dataset unit, the at least one small unstructured dataset unit comprising at least one of a paragraph or a sentence. In some embodiments, the automated metadata generation system may continue to break down the at least one small unstructured dataset unit into smaller unstructured dataset units until the small unstructured dataset units consist of words or terms, only, rather than full sentences, phrases, and/or the like.

In some embodiments, and as shown in block 506, the process flow 500 may include the step of removing at least one syncategorematic term and at least one special character from the at least one small unstructured dataset unit, wherein the at least one small unstructured dataset has been parsed into a preprocessed dataset unit. As used herein, a syncategorematic term may refer to a word with no semantic value such as "the," "that," and/or the like, which are not relevant to the description of the object and do not need to be part of the object metadata. As used herein, a special character may refer to punctuation marks such as ",." or ".", and/or the like.

In some embodiments, and as shown in block 508, the process flow 500 may include the step of outputting the at least one preprocessed dataset unit to the NLP attribute extraction model of the extraction layer for further processing. In some embodiments, the preprocessed dataset unit consists of text data comprising an object description (e.g., merchant description where the object is a merchant, such as paragraph, sentence, customer reviews, and/or the like) and/or general object information (e.g., a longer description of a merchant description, such as an entire webpage and/or website). In either instance, the automated metadata generation system will pre-process the data of the object description and/or general object information, such that the NLP models/engines can analyze the data, like the process described above with respect to at least FIG. 3.

FIG. 6 illustrates a process flow 600 for extracting object metadata along with its corresponding term importance score, in accordance with an embodiment of the invention. In some embodiments, a automated metadata generation system (e.g., similar to one or more of the automated metadata generation system s described herein with respect to FIGS. 1A-1C and 2) may perform one or more of the steps of process flow 600. For example, an automated metadata generation system (e.g., the automated metadata generation system 130 described herein with respect to FIG. 1A-1C) may perform the steps of process 600.

In some embodiments, and as shown in block 602, the process flow 600 may include the step of performing text identification of the at least one preprocessed dataset unit by identifying at least one sentence and selecting at least one candidate metadata term of the at least one preprocessed dataset unit, wherein the at least one candidate metadata term consists of at least one word. In some embodiments, the at least one candidate metadata term consists of at least one word, or a plurality of words describing a merchant, a merchant's product(s), a merchant's service(s), a business, and/or the like. By way of non-limiting example, such a description of a merchant may comprise such descriptions as "Italian restaurant", "family-oriented", "kids-friendly", "creative cuisine" for restaurants or "school supply", "dancing outfit" for department stores, and/or the like. Similarly, and by way of non-limiting example, the at least one candidate metadata term(s) could be used to describe deals and offers to provide user-relevant deals (e.g., users of clients, such as customers of a client) & offer presentations on a client's web page, by identifying the candidate metadata terms that are relevant to deals and offers offered to users of the input sources.

In some embodiments, and as shown in block 604, the process flow 600 may include the step of representing the at least one candidate metadata term with at least one feature. In some embodiments, a features may comprise a term frequency, co-occurrence with other words, how the term is used in a sentence, how the term is used in a paragraph or page, and/or the like. As used herein, the term "co-occurrence" may refer to the frequency that certain words show up near each other (e.g., the frequency that words occur together and/or near each other). For instance, the co-occurrence may comprise a frequency of words when they are located right next each other within a sentence (such as within a webpage), a frequency of words when the words are located a single word away from each other, two words away from each other, three words away from each other, four words away from each other, five words away from each other, and/or the like, and/or a frequency of words that appear in the same sentence.

In some embodiments, a feature may comprise a formatting of a metadata, such as specific format of text data. For instance, a feature may comprise a bolding of text data, a italicize of text data, an underlining of text data, a highlighting of text data, and/or the like.

In some embodiments, and as shown in block 606, the process flow 600 may include the step of scoring the at least one candidate metadata term based on the at least one feature. For instance, and based on the feature comprising a term frequency and/or co-occurrence, the greater the frequency, the greater the score of the candidate metadata term. In some embodiments, certain features will be assigned certain values depending on how important each feature is defined to be (e.g., a feature such as a bolding, and/or the like, may be identified as very important by the automated metadata generation system. In some embodiments, the assignment of certain values depending on the pre-identified importance of each feature may be pre-identified or pre-defined by a manager of the automated metadata generation system, a client of the automated metadata generation system, a user of the automated metadata generation system (e.g., a user of the client), by the automated metadata generation system itself (e.g., based on training of the NLP engines) and/or the like.

In some embodiments, and as shown in block 608, the process flow 600 may include the step of assigning the term importance score to the at least one candidate metadata term. Each candidate metadata term will have its own term importance score, even in cases of similar terms or phrases. By way of non-limiting example, the candidate terms may comprise similar phrases such as "serves red-sauce" and "red-sauce entrees" or "Italian eatery" and "Italian" may each have their own term importance scores, but may have similar values of their term importance scores.

In some embodiments, and as shown in block 610, the process flow 600 may include the step of creating a list of at least one candidate metadata term(s) in order of term importance score rankings.

In some embodiments, the list may be tuned and/or refined by changing the acceptable similarity between terms and/or the number of terms on the list. For instance, an acceptable similarity may refer to how similar the automated metadata generation system will allow the terms to be. By way of non-limiting example, if the output is tuned to allow for high similarity, then terms like "Italian eatery", "Italian", and "eatery" may all appear in the final output. Similarly, and by way of example, if the output is tuned to allow for low similarity, then only "Italian eatery" may appear in the final output. Additionally, and/or alternatively, if the list is tuned/refined by changing the number of terms on the list, only a certain number or threshold of terms will be shown on the list (e.g., no more than 20 terms, and/or the like).

In some embodiments, and as shown in block 612, the process flow 600 may include the step of outputting the list of at least one candidate metadata term as object metadata with its corresponding term importance score to the metadata storage. In this manner, all object metadata and their corresponding term importance scores will be sent to metadata storage and they will also be sent to the assignment layer for tuning the generation layer (i.e., for tuning the pretrained generative NLP model).

FIG. 7 illustrates a process flow 700 for generating and transmitting the metadata interface component, in accordance with an embodiment of the invention. In some embodiments, an automated metadata generation system (e.g., similar to one or more of the automated metadata generation system s described herein with respect to FIGS. 1A-1C and 2) may perform one or more of the steps of process flow 700. For example, an automated metadata generation system (e.g., the automated metadata generation system 130 described herein with respect to FIG. 1A-1C) may perform the steps of process 700.

In some embodiments, and as shown in block 702, the process flow 700 may include the step of generating, based on the object metadata of the extraction layer and the generative metadata of the generative layer, a metadata interface component comprising the object metadata, the generative metadata, and the term importance score. By way of example, the metadata interface component may comprise a data packet of the object metadata, the generative metadata, and the term importance score(s) in a computer readable format, and in a format that can configure a graphical user interface (GUI) of a user device to show the object metadata, the generative metadata, and the term importance score(s) on the GUI in a human-readable format. In some embodiments, the metadata interface component may comprise a table of terms and term importance scores, such as a table with each term, word, phrase, and/or the like listed out for each object and each term's associated term importance score.

In some embodiments, the output of the extraction layer will be available as soon as the automated metadata generation system is running, but the output of generation layer will take longer as the generative layer will take a longer time to train based on the output of the extraction layer and assignment layer. In this manner, the metadata interface component comprising the object metadata, the generative metadata, and the term importance score may take longer to generate (e.g., until at least a first generative metadata is generated), but upon the generative metadata being generated, the automated metadata generation system may automatically generate the metadata interface component.

In some embodiments, and as shown in block 704, the process flow 700 may include the step of transmitting the metadata interface component to a user device, wherein the metadata interface component configures a graphical user interface (GUI) of the user device. For example, and upon generating the metadata interface component, the automated metadata generation system may transmit the metadata interface component to a user device, such as a user device associated with a user of the automated metadata generation system, a user device associated with a client of the automated metadata generation system (e.g., a user device associated with a particular team within a client, such as a legal team, an information technology (IT) team, a business team, and/or the like), and/or the like.

Based on the user device receiving the metadata interface component, the metadata interface component may automatically and dynamically configure the GUI of the user device to show the object metadata, the generative metadata, and the term importance score(s) in a human-readable format. Based on this configuration of the GUI of the user device, the automated metadata generation system may further be configured to receive user inputs from the user device, whereby such user inputs may accept and/or reject the object metadata, the generative metadata, and the term importance score(s). Such an embodiment is further explained in hereinbelow with respect to FIG. 8.

FIG. 8 illustrates a process flow 800 for training the classification model and tuning the generative model using input from the metadata interface component, in accordance with an embodiment of the invention. In some embodiments, a a automated metadata generation system (e.g., similar to one or more of the automated metadata generation system s described herein with respect to FIGS. 1A-1C and 2) may perform one or more of the steps of process flow 800. For example, an automated metadata generation system (e.g., the automated metadata generation system 130 described herein with respect to FIG. 1A-1C) may perform the steps of process 800.

In some embodiments, and as shown in block 802, the process flow 800 may include the step of receiving an input from the metadata interface component, wherein the input will represent either approval or disapproval of the object metadata or the generative metadata. For example, the automated metadata generation system may receive an input the user device that comprises the GUI that has been configured by the metadata interface component, whereby the configured GUI may comprise a user-selectable interface component element indicating an acceptance and/or rejection of each of the elements of the metadata interface component (i.e., each of the object metadata, each of the generative metadata, and each of the term importance scores of an object and/or a for a plurality of objects). In this manner, the user input(s) from the metadata interface component may be used for feedback to the automated metadata generation system and for feedback to the NLP engines in order to better generate or identify the object metadata, to better generate the generative metadata, and to better generate the term importance scores.

Further, and as described herein, the automated metadata generation system may be trained by this user input iteratively and continuously until the automated metadata generation system can eventually perform the entire process without any human input. Thus, and as the user inputs are continuously received and as the user inputs start to only comprise approvals of the object metadata, of the generative metadata, and of the term importance scores, the automated metadata generation system may determine it has been trained and refined enough to make its own accurate determinations without manual interference.

In some embodiments, and as shown in block 804, the process flow 800 may include the step of training the NLP classification model of the assignment layer using the input of the graphical user interface. For example, the automated metadata generation system-based on the received user inputs of block 802—may train the NLP engines, such as the NLP classification model, to better classify and verify the classifications of the object metadata. Similarly, the user inputs of the GUI may additionally and/or alternatively train the NLP attribute extraction model and the pretrained generative NLP model.

Additionally, the NLP classification model may learn from both the output of the NLP attribute extraction model and the confirmations and/or rejections of the user input(s) to better refine its classifications and verifications at a future time. In this manner, the training by the output of the NLP attribute extraction model and the user inputs will allow the NLP classification model to build rules to tune the generative NLP model.

In some embodiments, and as shown in block 806, the process flow 800 may include the step of tuning the pretrained generative NLP model of the generative layer using the input from the graphical user interface input source. Such tuning may comprise reconfiguring the NLP engine algorithms, using an optimization algorithm on the NLP engine(s), selecting new parameters for the NLP engine(s), and/or the like. Such tuning may then lead to greater accuracy of the NLP engine(s)/model(s) in order to increase the performance of the NLP engine(s)/model(s). Thus, after enough tuning and training, the generative NLP model will be able to generate object metadata on its own.

As will be appreciated by one of ordinary skill in the art, the present invention may be embodied as an apparatus (including, for example, a automated metadata generation system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for generating, extracting, classifying, and formatting object metadata using natural language processing in an electronic network, the system comprising:
    a memory device with computer-readable program code stored thereon;
    at least one processing device, wherein executing the computer-readable code is configured to cause the at least one processing device to perform the following operations:
        identify at least one input source, wherein the at least one input source comprises at least one input data;
        parse the at least one input data;
        output, by an extraction layer, at least one object metadata and a term importance score associated with the input data to a metadata storage, wherein the extraction layer comprises a natural language processing attribute extraction model, wherein the extraction layer receives at least one preprocessed dataset unit and extracts the at least one object metadata and the term importance score by:
            performing text identification of the at least one preprocessed dataset unit by identifying at least one sentence and selecting at least one candidate metadata term of the at least one preprocessed dataset unit, wherein the at least one candidate metadata term consists of at least one word;
            representing the at least one candidate metadata term with at least one feature;
            scoring the at least one candidate metadata term based on the at least one feature;
            assigning the term importance score to the at least one candidate metadata term;
                creating a list of the at least one candidate metadata term in order of term importance score rankings; and
                outputting the list of the at least one candidate metadata term as object metadata with its corresponding term importance score to the metadata storage;
        assemble, by an assignment layer, a corpus of text data and key phrases based on the object metadata from the extraction layer, wherein the assignment layer comprises an natural language processing classification model;
        classify and verify, by the assignment layer, the object metadata; and
        output, by a generative layer, at least one generative metadata to the metadata storage, wherein the generative layer comprises a pretrained generative natural language processing model that is tuned by the object metadata and the term importance score from the extraction layer and the corpus of text data and key phrases from the assignment layer.

2. The system of claim 1, wherein the processing device is further configured to:
    identify a scraping request; and
    access, based on the scraping request, at least one noisy descriptive dataset associated with the at least one input source.

3. The system of claim 2, wherein the processing device is further configured to parse the at least one input data by:
    receiving the at least one input data, the at least one input data comprising the at least one noisy descriptive dataset based on the scraper request;
    separating the at least one noisy descriptive dataset into at least one small unstructured dataset unit, the at least one small unstructured dataset unit comprising at least one of a paragraph or a sentence;

removing at least one syncategorematic term and at least one special character from the at least one small unstructured dataset unit, wherein the at least one small unstructured dataset has been parsed into a preprocessed dataset unit; and outputting the at least one preprocessed dataset unit to the natural language processing attribute extraction model of the extraction layer for further processing.

4. The system of claim 1, wherein an input to the input source further comprises previously generated metadata.

5. The system of claim 1, wherein the assignment layer will be trained by metadata that the assignment layer receives from the extraction layer, and wherein the assignment layer assigns the object metadata to at least one object description.

6. The system of claim 1, wherein the computer-readable code is configured to cause the at least one processing device to perform the following operations:

generate, based on the object metadata of the extraction layer and the generative metadata of the generative layer, a metadata interface component comprising the object metadata, the generative metadata, and the term importance score; and transmit the metadata interface component to a user device, wherein the metadata interface component configures a graphical user interface of the user device.

7. The system of claim 1, wherein the processing device is further configured to:

receive an input from the metadata interface component, wherein the input will represent either approval or disapproval of the object metadata or the generative metadata;

train the natural language processing classification model of the assignment layer using the input of the graphical user interface; and tune the pretrained generative natural language processing model of the generative layer using the input from the graphical user interface input source.

8. A computer program product for generating, extracting, classifying, and formatting object metadata using natural language processing in an electronic network, wherein the computer program product comprises at least one non-transitory computer-readable medium having computer-readable program code portion embodied therein, the computer-readable program code portions which when executed by a processing device are configured to cause a processor to:

identify at least one input source, wherein the at least one input source comprises at least one input data;

parse the at least one input data;

output, by an extraction layer, at least one object metadata and a term importance score associated with the input data to a metadata storage, wherein the extraction layer comprises a natural language processing attribute extraction model, wherein the extraction layer receives at least one preprocessed dataset unit and extracts the at least one object metadata and the term importance score by:

performing text identification of the at least one preprocessed dataset unit by identifying at least one sentence and selecting at least one candidate metadata term of the at least one preprocessed dataset unit, wherein the at least one candidate metadata term consists of at least one word;

representing the at least one candidate metadata term with at least one feature;

scoring the at least one candidate metadata term based on the at least one feature;

assigning the term importance score to the at least one candidate metadata term;

creating a list of the at least one candidate metadata term in order of term importance score rankings; and outputting the list of the at least one candidate metadata term as object metadata with its corresponding term importance score to the metadata storage;

assemble, by an assignment layer, a corpus of text data and key phrases based on the object metadata from the extraction layer and classify and verify the object metadata, wherein the assignment layer comprises a natural language processing classification model; and output, by a generative layer, generative metadata to the metadata storage, wherein the generative layer comprises a pretrained generative natural language processing model that is tuned by the object metadata and the term importance score from the extraction layer and the corpus of text data and key phrases from the assignment layer.

9. The computer program product of claim 8, wherein the processing device is further configured to:

identify a scraping request; and access, based on the scraping request, at least one noisy descriptive dataset associated with the at least one input source.

10. The computer program product of claim 9, wherein the processing device is further configured to parse the at least one input data by:

receiving the at least one input data, the at least one input data comprising the at least one noisy descriptive dataset based on the scraper request;

separating the at least one noisy descriptive dataset into at least one small unstructured dataset unit, the at least one small unstructured dataset unit comprising at least one of a paragraph or a sentence;

removing at least one syncategorematic term and at least one special character from the at least one small unstructured dataset unit wherein the at least one small unstructured dataset has been parsed into a preprocessed dataset unit; and outputting the at least one preprocessed dataset unit to the natural language processing attribute extraction model of the extraction layer for further processing.

11. The computer program product of claim 8, wherein an input to the input source further comprises previously generated metadata.

12. The computer program product of claim 8, wherein the computer-readable code is configured to cause the at least one processing device to perform the following operations:

generate, based on the object metadata of the extraction layer and the generative metadata of the generative layer, a metadata interface component comprising the object metadata and the generative metadata and the term importance score; and transmit the metadata interface component to a user device, wherein the metadata interface component configures a graphical user interface of the user device.

13. The computer program product of claim 8, wherein the processing device is further configured to:

receive an input from the metadata interface component, wherein the input will represent either approval or disapproval of the object metadata or the generative metadata;

train the natural language processing classification model of the assignment layer using the input of the graphical user interface; and tune the pretrained generative natural language processing model of the generative layer using the input from the graphical user interface input source.

14. A computer-implemented method for generating, extracting, classifying, and formatting object metadata using natural language processing in an electronic network, the computer-implemented method comprising:

identifying at least one input source, wherein the at least one input source comprises at least one input data;

parsing the at least one input data;

outputting, by an extraction layer, at least one object metadata and a term importance score associated with the input data to a metadata storage, wherein the extraction layer comprises a natural language processing attribute extraction model, wherein the extraction layer receives at least one preprocessed dataset unit and extracts the at least one object metadata and the term importance score by:

performing text identification of the at least one preprocessed dataset unit by identifying at least one sentence and selecting at least one candidate metadata term of the at least one preprocessed dataset unit, wherein the at least one candidate metadata term consists of at least one word;

representing the at least one candidate metadata term with at least one feature;

scoring the at least one candidate metadata term based on the at least one feature;

assigning the term importance score to the at least one candidate metadata term;

creating a list of the at least one candidate metadata term in order of term importance score rankings; and outputting the list of the at least one candidate metadata term as object metadata with its corresponding term importance score to the metadata storage;

assembling, by an assignment layer, a corpus of text data and key phrases based on the object metadata from the extraction layer and classify and verify the object metadata, wherein the assignment layer comprises a natural language processing classification model; and outputting, by a generative layer, generative metadata to the metadata storage, wherein the generative layer comprises a pretrained generative natural language processing model that is tuned by the object metadata and the term importance score from the extraction layer and the corpus of text data and key phrases from the assignment layer.

15. The computer-implemented method of claim 14, wherein an input to the input source further comprises previously generated metadata.

16. The computer-implemented method of claim 14, wherein the computer-implemented method is further configured to:

identifying a scraping request; and accessing, based on the scraping request, at least one noisy descriptive dataset associated with the at least one input source.

17. The computer-implemented method of claim 16, wherein the computer-implemented method is further configured to parse the at least one input data by:

receiving the at least one input data, the at least one input data comprising the at least one noisy descriptive dataset based on the scraper request;

separating the at least one noisy descriptive dataset into at least one small unstructured dataset unit, the at least one small unstructured dataset unit comprising at least one of a paragraph or a sentence;

removing at least one syncategorematic term and at least one special character from the at least one small unstructured dataset unit wherein the at least one small unstructured dataset has been parsed into a preprocessed dataset unit; and outputting the at least one preprocessed dataset unit to the natural language processing attribute extraction model of the extraction layer for further processing.

\* \* \* \* \*